US006371794B1

(12) United States Patent
Bauer et al.

(10) Patent No.: US 6,371,794 B1
(45) Date of Patent: Apr. 16, 2002

(54) TELECOMMUNICATIONS PLUG AND ADAPTER

(75) Inventors: Arthur D. Bauer, Southington; Randy J. Below, Cheshire; John A. Siemon, Woodbury, all of CT (US)

(73) Assignee: The Siemon Company, Watertown, CT (US)

(*) Notice: Subject to any disclaimer, the term of this patent is extended or adjusted under 35 U.S.C. 154(b) by 0 days.

(21) Appl. No.: 09/416,326

(22) Filed: Oct. 12, 1999

Related U.S. Application Data
(60) Provisional application No. 60/103,928, filed on Oct. 13, 1998.

(51) Int. Cl.[7] .............................. H01R 4/24; H01R 4/26; H01R 11/20
(52) U.S. Cl. ........................ 439/404; 439/455; 439/941
(58) Field of Search .................................. 439/404, 405, 439/417, 455, 467, 941, 76.1

(56) References Cited

U.S. PATENT DOCUMENTS

| | | | |
|---|---|---|---|
| RE32,760 E | * 10/1988 | Chandler et al. | ............ 439/188 |
| 5,234,358 A | * 8/1993 | Polar | ........................... 439/465 |
| 5,580,270 A | * 12/1996 | Pantland et al. | ............. 439/395 |
| 5,599,202 A | * 2/1997 | Key | ............................ 439/459 |
| 5,697,806 A | * 12/1997 | Whiteman et al. | .......... 439/417 |
| 5,921,806 A | * 7/1999 | Shuey | ......................... 439/464 |
| 5,975,936 A | * 11/1999 | Lin et al. | ..................... 439/404 |

OTHER PUBLICATIONS

Pypline by Herman Miller, date unknown, 2 pages, (No Date.).
MODU–COMM by Domore DO3, date unknown, 2 pages, (No Date.).
DataThing by Krone/Haworth, date unknown, 4 pages, (No Date.).
D8GS by Lucent, date unknown, (No Date.).

* cited by examiner

*Primary Examiner*—Karl D. Easthom
*Assistant Examiner*—Kyung S. Lee
(74) *Attorney, Agent, or Firm*—Cantor Colburn LLP

(57) ABSTRACT

An exemplary embodiment of the invention is a telecommunications plug for use with a cable including a plurality of wires. The plug includes a plug base having a termination portion including a plurality of contact slots. Each contact slot receives one of the wires. A plurality of contacts each has an insulation displacement end and is positioned in a respective contact slot for establishing electrical connection with one of the wires. A plug cover having a plurality of ribs each aligned with one of the contact slots mates with the termination portion. The ribs contact the wires to provide strain relief to the wires.

17 Claims, 16 Drawing Sheets

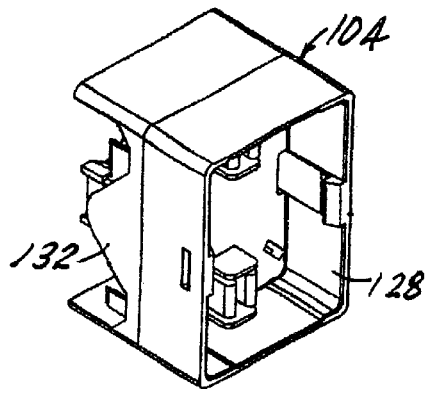
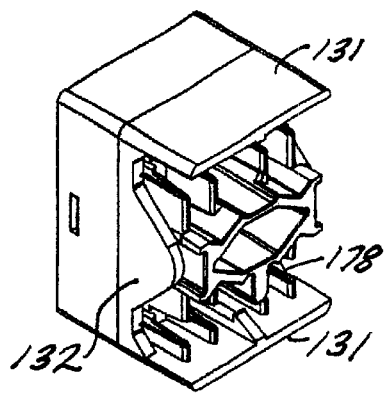
FIG. 7    FIG. 8
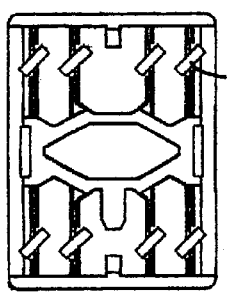
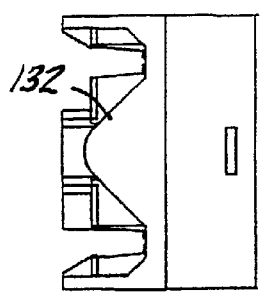
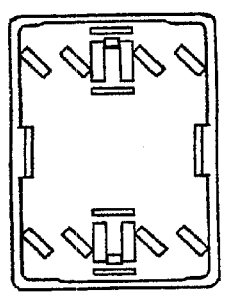
FIG. 9    FIG. 10    FIG. 11

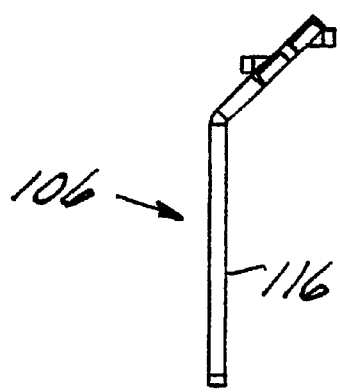
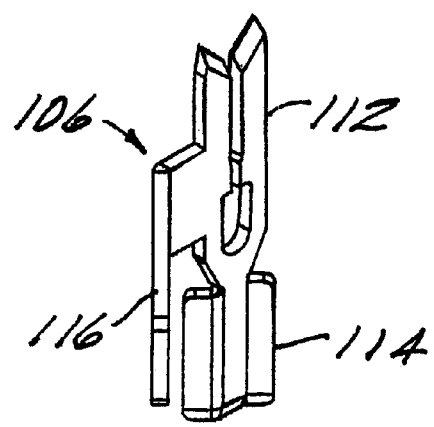
FIG. 12
FIG. 13
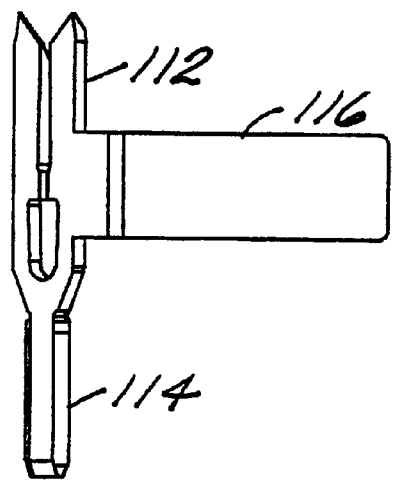
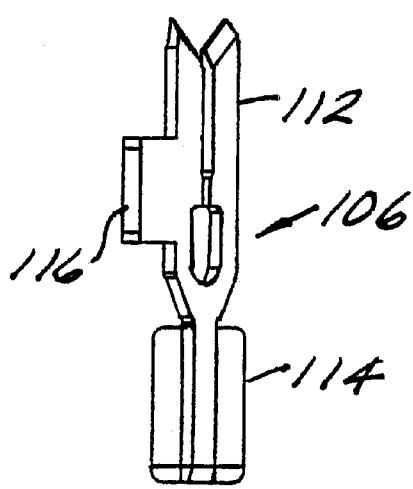
FIG. 14
FIG. 15

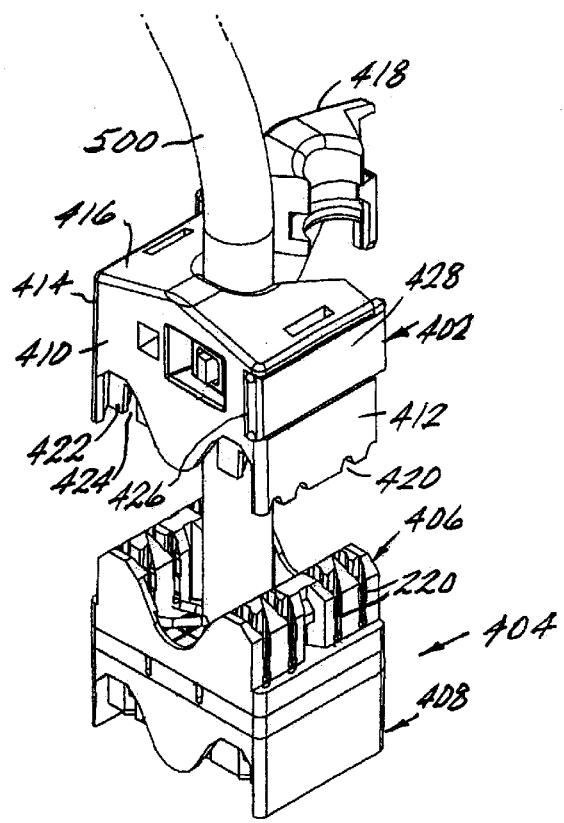
FIG. 29
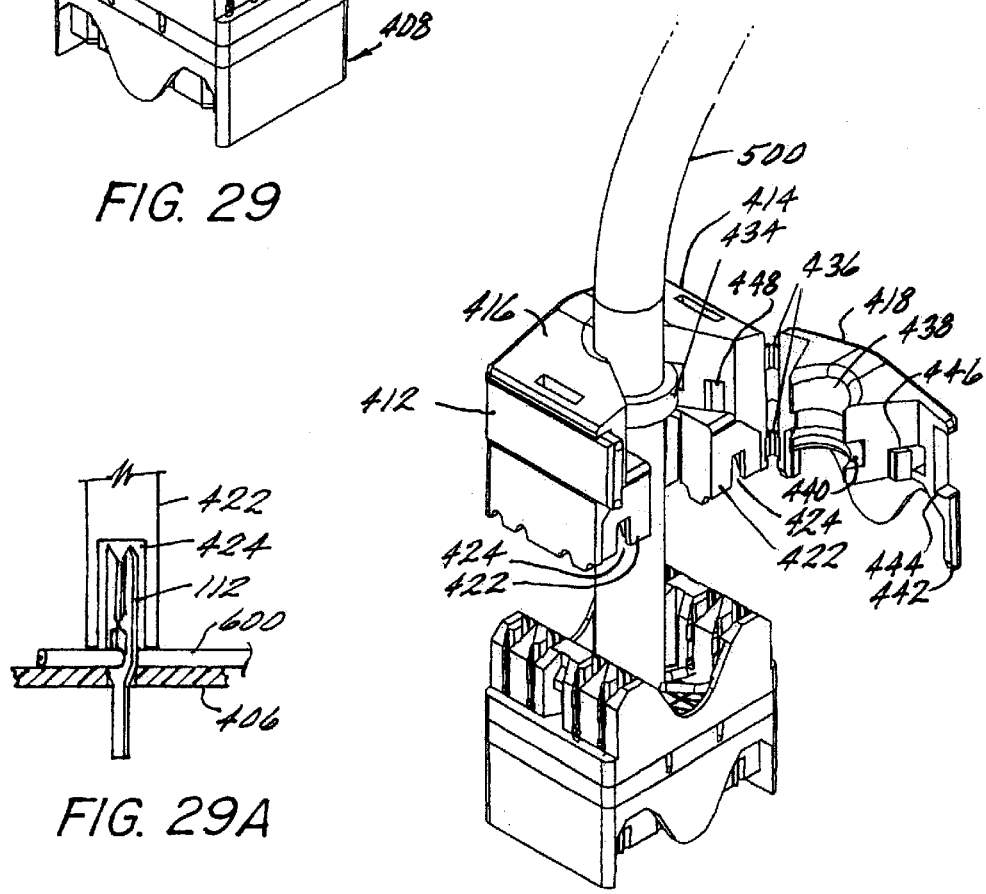
FIG. 29A
FIG. 30

TELECOMMUNICATIONS PLUG AND ADAPTER

CROSS REFERENCE TO RELATED APPLICATIONS

This application claims the benefit of U.S. provisional patent application Ser. No. 60/103,928 filed Oct. 13, 1998, the entire contents of which are incorporated herein by reference.

BACKGROUND OF THE INVENTION

The invention relates to telecommunications connectors for coupling cables transmitting voice and/or data signals and in particular is directed to a telecommunications plug and telecommunications adapter having enhanced performance characteristics. Improvements in telecommunications systems have resulted in the ability to transmit voice and/or data signals along transmission lines at increasingly higher frequencies. Several industry standards that specify multiple performance levels of twisted-pair cabling components have been established. The primary references, considered by many to be the international benchmarks for commercially based telecommunications components and installations, are standards ANSI/TIA/EIA-568-A (/568) Commercial Building Telecommunications Cabling Standard and 150/IEC 11801 (/11801), generic cabling for customer premises.

For example, Category 3, 4 and 5 cable and connecting hardware are specified in both /568 and /11801, as well as other national and regional specifications. In these specifications, transmission requirements for Category 3 components are specified up to 16 MHZ. Transmission requirements for Category 4 components are specified up to 20 MHZ. Transmission requirements for Category 5 components are specified up to 100 MHZ. New standards are being developed continuously and currently it is expected that future standards will require transmission requirements of at least 600 MHZ.

The above referenced transmission requirements also specify limits on near-end crosstalk (NEXT). Often, telecommunications connectors are organized in sets of pairs, typically made up of a tip and ring connector. As telecommunications connectors are reduced in size, adjacent pairs are placed closer to each other creating crosstalk between adjacent pairs. To comply with the near-end crosstalk requirements, a variety of techniques are used in the art.

Existing telecommunications products include plugs, outlets and connecting blocks. Each of these devices can suffer from crosstalk as the rate of transmission increases. Existing plugs, outlets and connecting blocks, such as those offered by The Siemon Company, provide for enhanced performance. While these products are well suited for their intended applications, there is a need in the art for a plug-adapter-plug system which facilitates moves and changes in telecommunications cabling systems and also meets high performance standards.

SUMMARY OF THE INVENTION

An exemplary embodiment of the invention is a telecommunications plug for use with a cable including a plurality of wires. The plug includes a plug base having a termination portion including a plurality of contact slots. Each contact slot receives one of the wires. A plurality of contacts each has an insulation displacement end and is positioned in a respective contact slot for establishing electrical connection with one of the wires. A plug cover having a plurality of ribs each aligned with one of the contact slots mates with the termination portion. The ribs contact the wires to provide strain relief to the wires.

BRIEF DESCRIPTION OF THE DRAWINGS

Referring now to the drawings wherein like elements are numbered alike in the several FIGURES:

FIG. 7 is a perspective view of the plug base;

FIG. 8 is another perspective view of the plug base;

FIG. 9 is a front view of the plug base;

FIG. 10 is a side view of the plug base;

FIG. 11 is a rear view of the plug base;

FIGS. 12–15 are assorted views of a first contact;

FIG. 29 is a perspective view of a second alternative plug;

FIG. 29A depicts strain relief of an individual wire;

FIG. 30 is a perspective view of the second alternative plug;

DETAILED DESCRIPTION OF THE INVENTION

Figure 1:
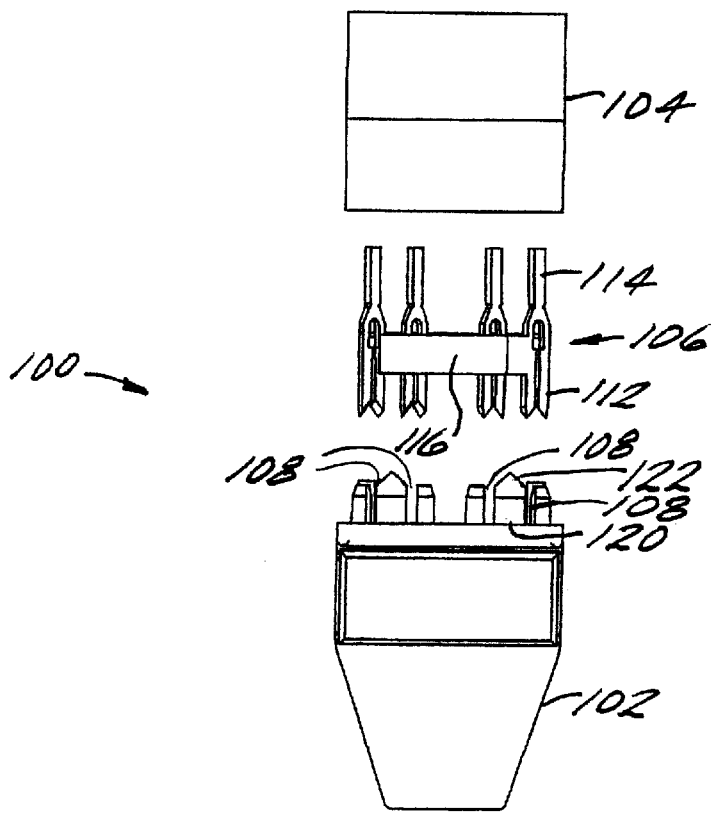
FIG. 1 is an exploded, top view of a plug.
Figure 2:
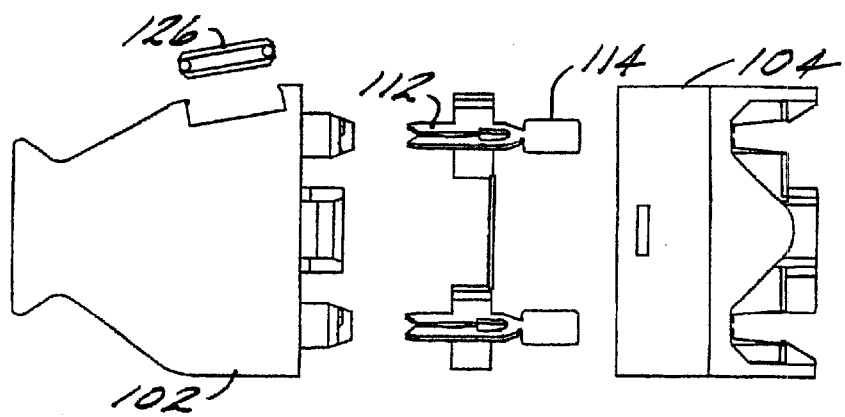
FIG. 2 is an exploded, right side view of the plug.
Figure 3:
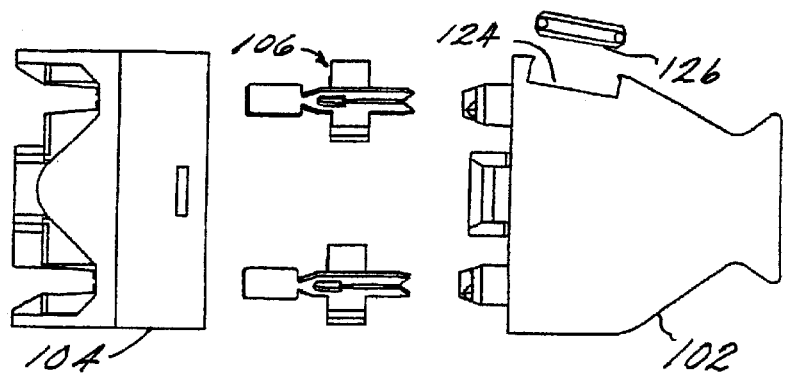
FIG. 3 is an exploded, left side view of the plug.
Figure 4:
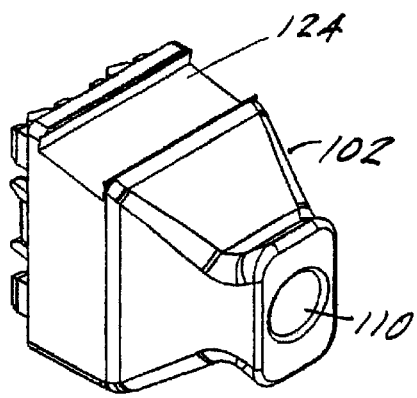
FIG. 4 is a perspective view of the plug cover.
Figure 5:
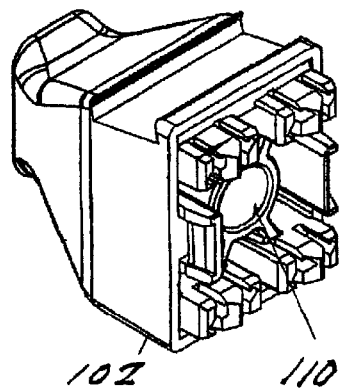
FIG. 5 is another perspective view of the plug cover.
Figure 6:
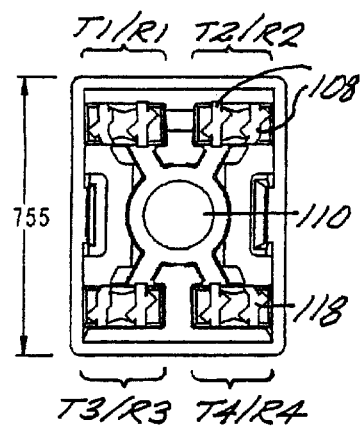
FIG. 6 is a front view of the plug cover.
Figure 16:
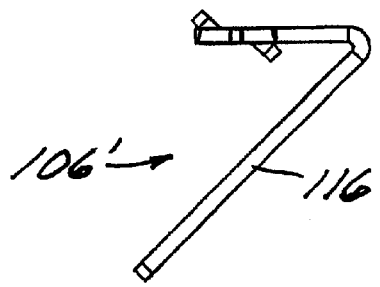
FIGS. 16–19 are assorted views of a second contact.
Figure 17:
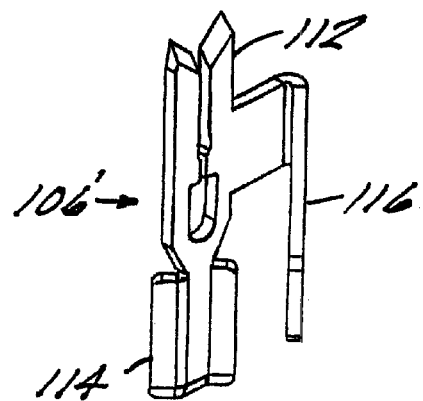
Figure 18:
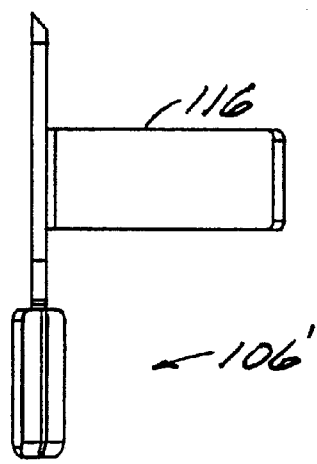
Figure 19:
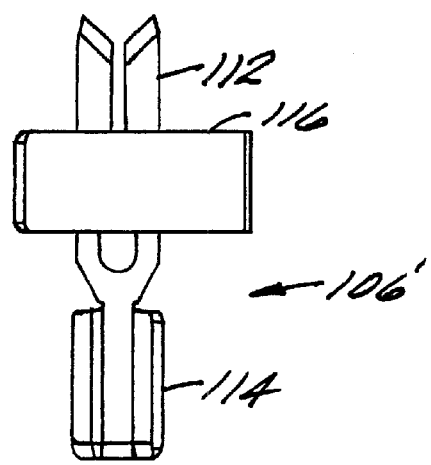

FIG. 1 is an exploded, top view of a plug 100 in accordance with an exemplary embodiment of the invention. The plug 100 is made up of a plug cover 102, a plug base 104 and a plurality of plug contacts 106. Plug 100 is for use with a cable having four pairs of twisted wires (i.e. eight wires). One wire in a pair corresponds to a tip conductor and the other wire in the pair corresponds to a ring conductor. The plug cover 102 includes a plurality of wire retaining slots 108 arranged radially about a central cable entrance hole 110 as best shown in FIG. 6. As shown in FIG. 6, the incoming wires are arranged in pairs that are spaced from each other. Pair T1/R1 is positioned in the upper left of FIG. 6, pair T2/R2 is positioned in the upper right of FIG. 6, pair T3/R3 is position in the lower left of FIG. 6 and pair T4/R4 is positioned in the lower right of FIG. 6. Isolating the pairs from each other is helpful in reducing crosstalk between pairs.

Contacts 106 have an insulation displacement end 112, a contact end 114 and a plate 116 extending away from the contact 106. The insulation displacement end 112 is placed in insulation displacement slot 118 shown in FIG. 6. When the insulation displacement end 112 is placed in insulation displacement slot 118, the insulation displacement end 112 pierces the insulation on the wire in wire receiving slot 108 to make electrical contact. The insulation displacement slot 118 is oriented 45 degrees relative to the wire receiving slot. Orienting the insulation displacement ends 112 at 45 degrees relative to the wire allows the contacts 106 of a pair to be positioned closer together. This allows pairs of contacts to be spaced farther apart, which reduces crosstalk between pairs of contacts.

Positioned between each wire receiving slot 108 is a tooth 120 having a tooth tip 122. Tooth tip 122 is formed by angling side walls of tooth 120 towards each other to establish a tip having a reduced dimension. The tooth tip 122 facilitates installation of wires into the plug cover 102. As noted above, each pair of wires is twisted and must be partially untwisted to be installed in the wire receiving slots 108. The twisted wires can be pushed over tooth tip 122 to separate the wires and facilitate installation.

The plug cover 102 includes a channel 124 for receiving an identification icon 126. The identification icon 126 can be used to color code the plug cover and also identify the type of signal (e.g. voice, data, etc.) that is transmitted over plug 100.

FIGS. 7–11 are assorted views of the plug base 104. The bottom of the plug base 104 includes a cavity 128 which houses the insulation displacement end 112 and plate 116. The contact end 114 of the contacts 106 extend through openings 130 in the plug base 104. The contacts 106 may be mounted in the cavity 128 of the plug base 104 and the plug base 104-snapped onto the plug cover 102. During this engagement, the insulation displacement end 112 engages wires in the wire retaining slots 108 to make electrical contact. The openings 130 in plug base 104 are angled similar to the insulation displacement slots 118 in plug cover 102. In this manner, wires in the plug cover 102 are placed in electrical contact with contact 106 having contact ends 114 extending away from the plug base 104. As will be described herein, the contact ends 112 mate with contacts in an adapter 200.

The plug base 104 has four side walls 131 and 132 that extend away from cavity 128. Side walls 132 have an arcuate profile and align with corresponding arcuate walls on adapter 200 described herein. The plug 100 includes a keying post 178 and the adapter 200 includes a keying slot 180 (FIG. 25) to ensure that the plug 100 is properly oriented with the adapter 200.

FIGS. 12–15 are views of a first contact 106 used in the plug 100. The first contact 106 has an insulation displacement end 112 which, as is known in the art, pierces the insulation of a wire and makes electrical contact with the wire. The contact end 114 mates with an adapter contact described below with reference to adapter 200. A plate 116 extends away from the insulation displacement end 112 but may extend from any portion of contact 106. FIGS. 16–19 are views of a second contact 106' used in plug 100. The second contact 106' has an insulation displacement end 112 which, as is known in the art, pierces the insulation of a wire and makes electrical contact with the wire. The contact end 114 mates with an adapter contact described below with reference to adapter 200. A plate 116 extends away from the insulation displacement end 112 but may extend from any portion of contact 106'. Both first contact 106 and second contact 106' may be stamped out of metal.

Figure 20:
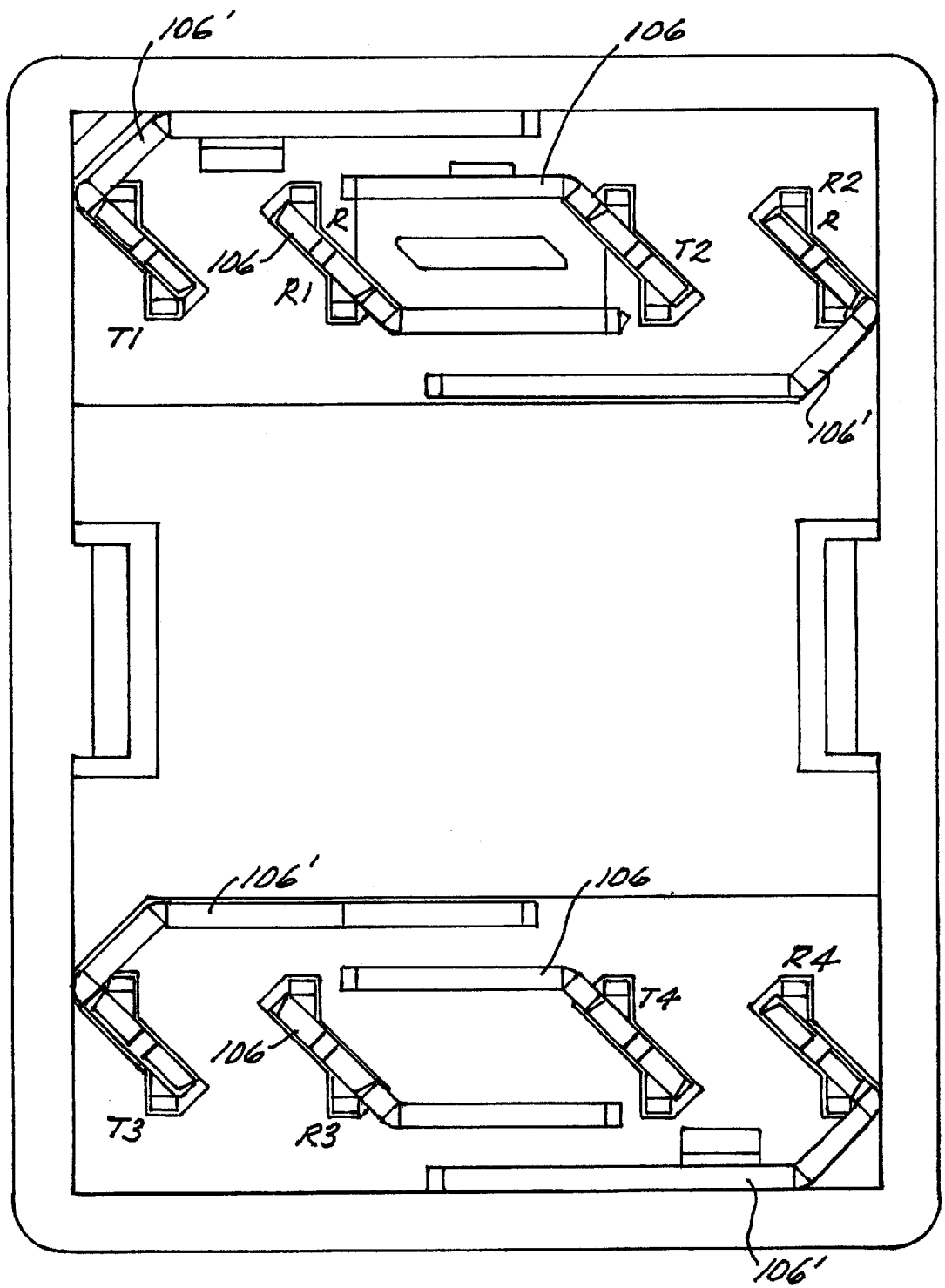
FIG. 20 is a front view of the plug base with the first and second contacts installed therein.
Figure 21:
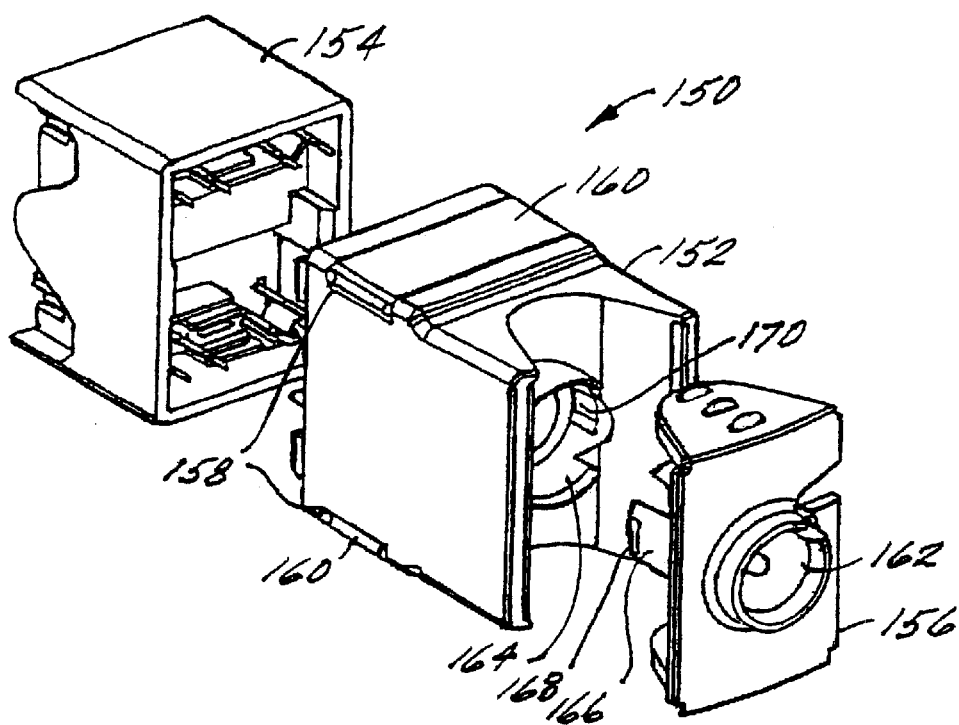
FIG. 21 is an exploded, perspective view of an alternative plug.
Figure 22:
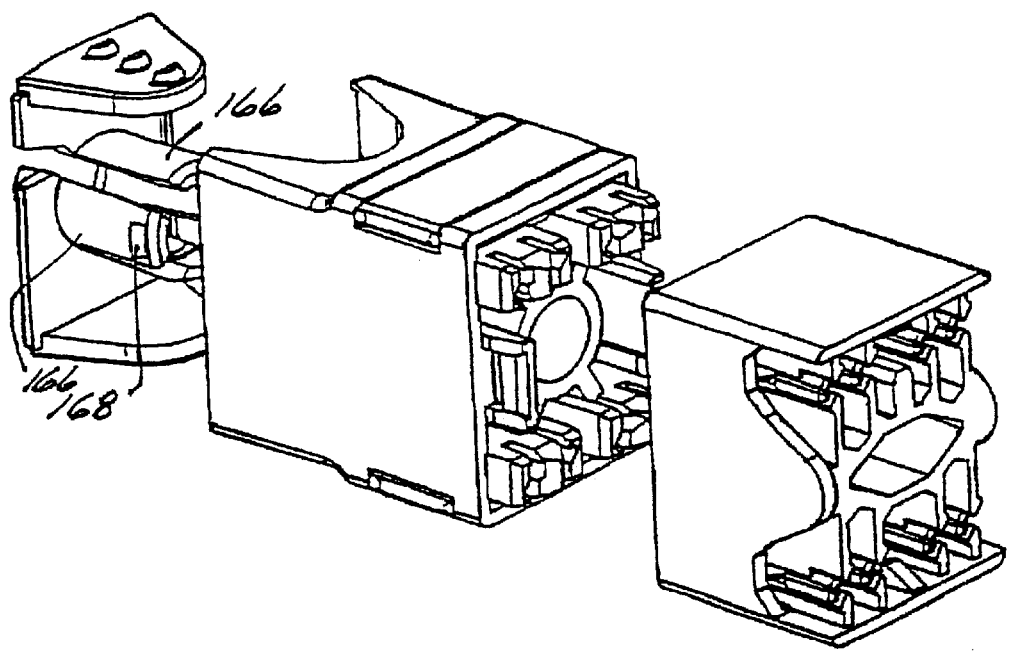
FIG. 22 is another exploded, perspective view of the alternative plug.
Figure 23:
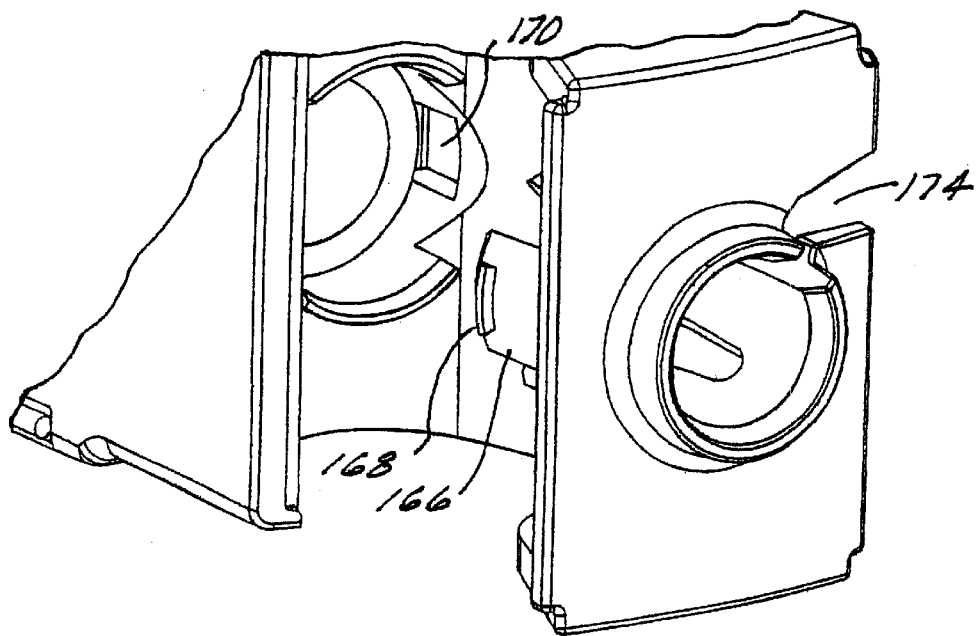
FIG. 23 is an exploded, perspective view of a portion of the alternative plug.
Figure 24:
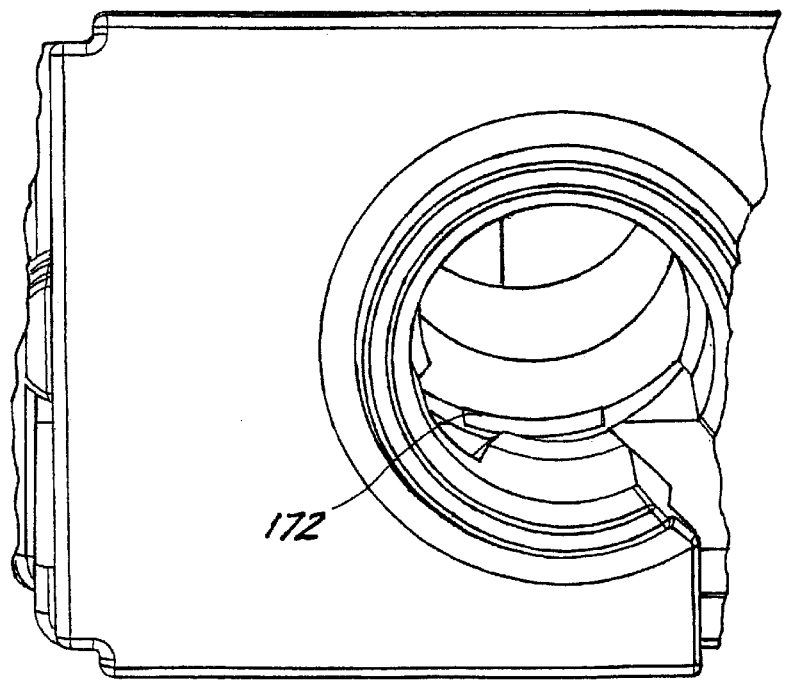
FIG. 24 is a perspective view of a portion of the alternative plug.

Plates 116 on contacts 106 and 106' are used to reduce crosstalk between pairs of contacts in the plug. As shown in FIG. 20, the contacts 106 and 106' are positioned in the plug base 104 so that there is reactive (e.g., capacitive and/or inductive) coupling between certain contacts. Plates 116 capacitively couple contact T1 and contact T2 to reduce crosstalk between pair 1 and pair 2. Similarly, plates 116 capacitively couple contacts R1 and R2 to reduce crosstalk between pair 1 and pair 2. A similar arrangement is used in pairs 3 and 4 to reduce crosstalk between these pairs.

FIGS. 21–24 are views of an alternative plug 150. Plug 150 includes a plug cover 152 and plug base 154. A plug end cap 156 is included to provide strain relief for the cable connected to plug 150. Plug cover 152 includes two channels 158 for receiving identification icons 160. Plug end cap 156 includes an opening 162 which is aligned with an opening 164 in the plug cover 164. Openings 162 and 164 provide a passage for the incoming cable. Extending away from opening 162 are four fingers that grip the jacket of in cable when the end cap 156 is mounted to plug cover 152. Each of the fingers 166 includes a projection 168 that engages a recess on the plug cover 152 in order to secure the end cap 156 to the plug cover 152. A ridge 172, having a triangular cross section, is positioned on the inside of each finger 166. When the end cap 156 is installed on plug cover 152, the fingers 166 are directed towards each other and converge towards the cable. The triangular ridge 172 is forced into the cable jacket to secure the cable and provide strain relief. A cable access opening 174 is provided on the end cap 156. This allows the end cap 156 to be placed over a cable already installed in the plug cover 152.

Figure 25:
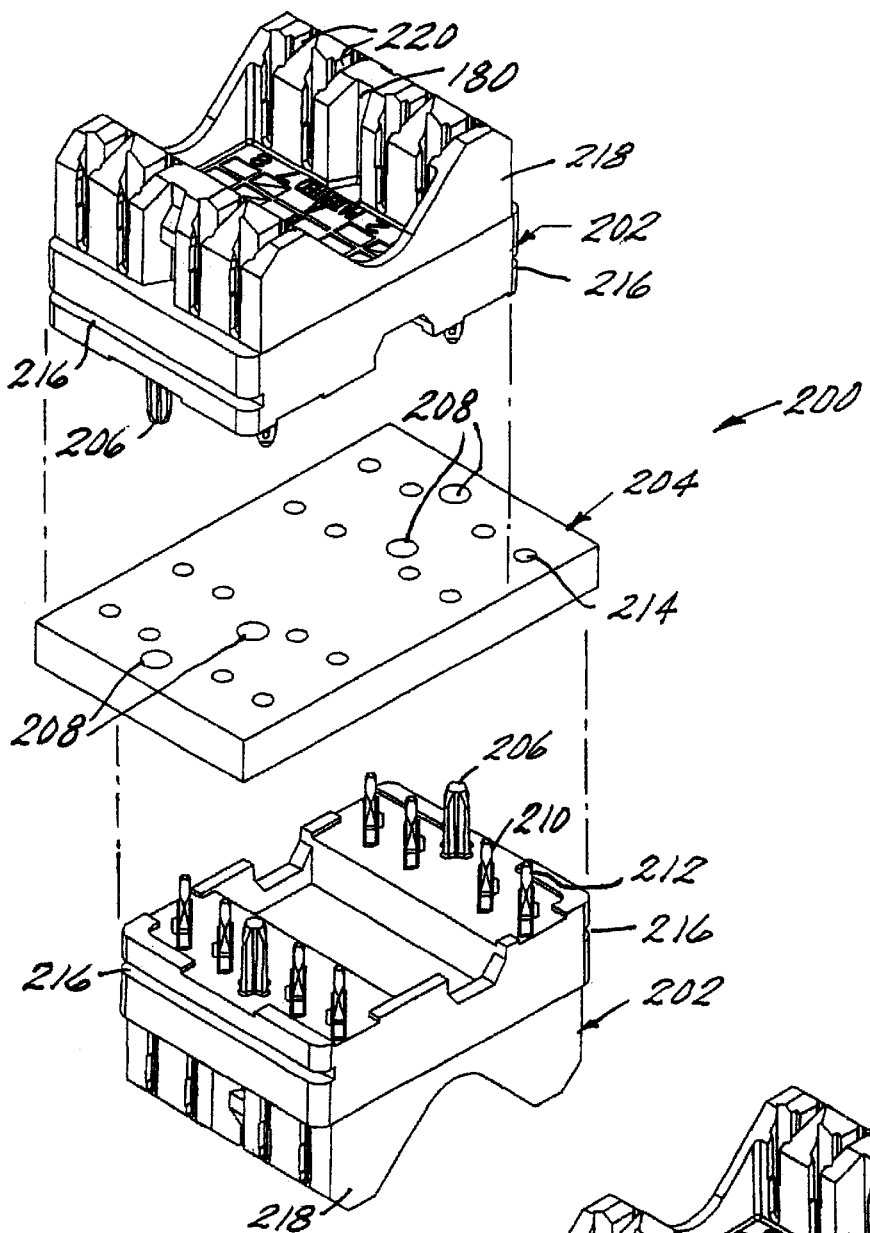
FIG. 25 is an exploded, perspective view of an adapter.
Figure 26:
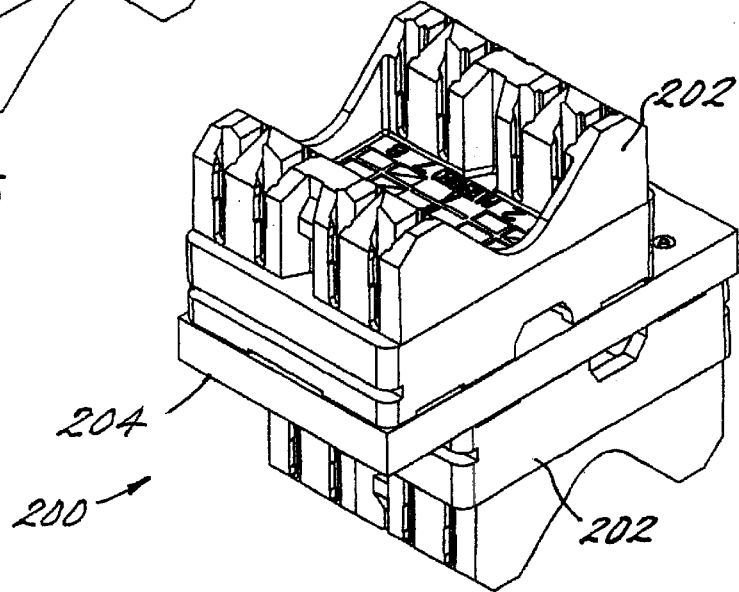
FIG. 26 is a perspective view of the adapter.

FIG. 25 is an exploded perspective view of an adapter 200 for mating with plug 100 or plug 150. The adapter is made up of a first and second connecting block 202 mounted back-to-back on a printed circuit board 204. Studs 206 on the connecting blocks 202 engage holes 208 in the circuit board to secure the connecting blocks 202 to the circuit board 204. Each connecting block 202 includes eight contacts 210 that mate with contacts 106 in the plug 100. Contacts 210 have press-fit tails 212 that engage plated through holes 214 in circuit board 204 to electrically connect the contacts 210 with traces on the circuit board 204. Contacts 210 are held in contact slots 220 and have a pair of arms that receive the contact end 114 as is known in the art. On two sides of the connecting block 202, a groove 216 is formed for mounting the connecting block in a bracket as described herein. Each connecting block 202 includes two sides walls 218 having an arcuate profile that corresponds to the accurate profile of side wall 132 on plug 100. Connecting block 202 has two rows of contact slots 220 and side walls 218 extend between the two rows of contact slots 220. The side walls 218 provide support to the ends of the connecting block which can become damaged during installation without additional structural support. FIG. 26 is a perspective view depicting the connecting blocks 202 mounted to circuit board 204.

Figure 27:
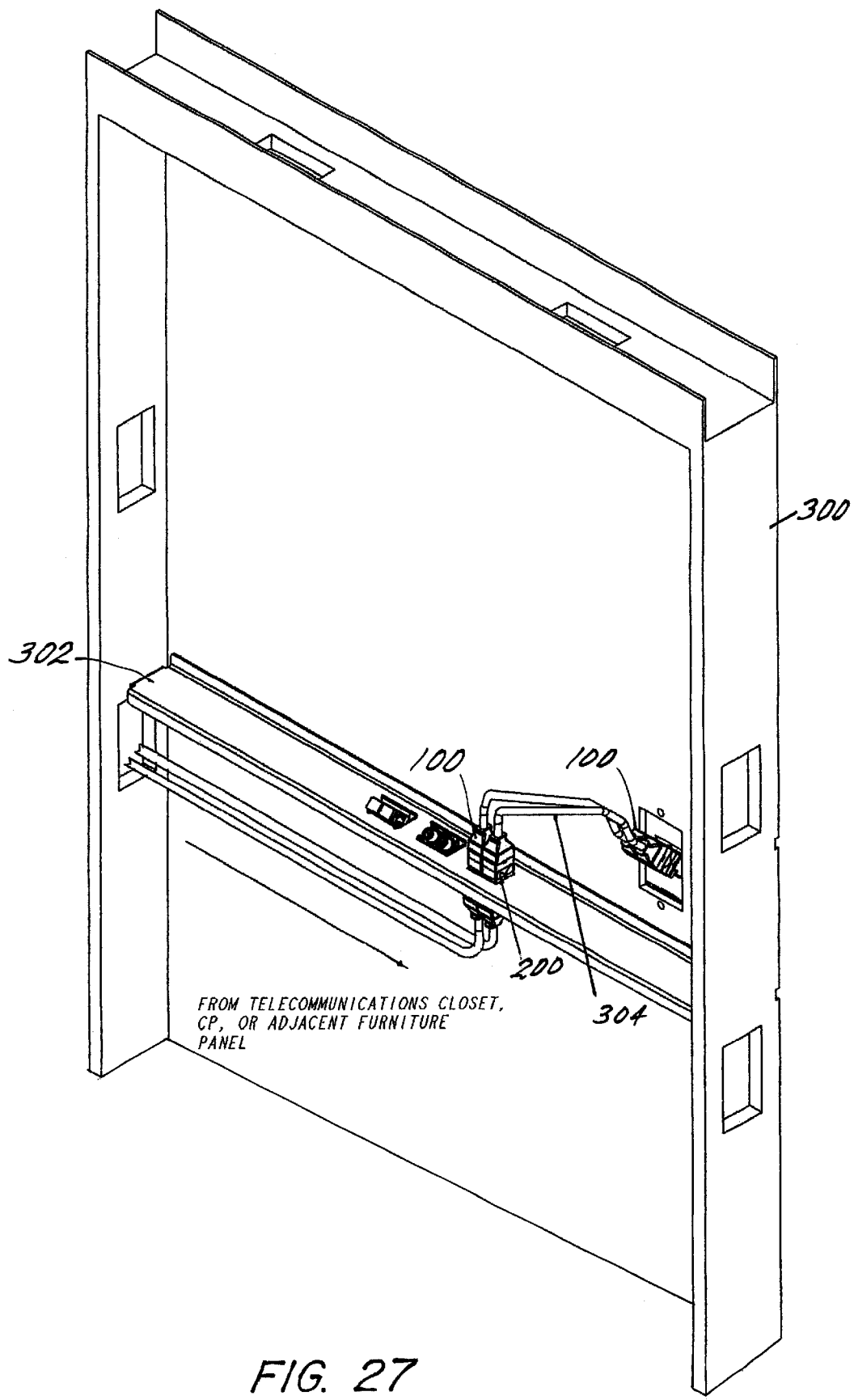
FIG. 27 is a perspective view of a furniture panel including the plug and adapter of the present invention.

FIG. 27 illustrates an exemplary application of the plug and adapter of the present invention. FIG. 27 depicts a furniture panel which may be, for example, used to define a work area such as a cubicle. The furniture panel includes a number of brackets including a mounting bracket 302 in which telecommunications adapters may be mounted. As shown in FIG. 27, two adapters 200 are mounted in the bracket 302. Two patch cord assemblies 304, each fitted with two plugs 100, are used to mate with adapters 200 and two work area outlets. The work area outlet includes a connecting block 202 similar to that used on the adapter 200 so that plug 100 mates with the work area outlet. An exemplary work area outlet is disclosed in pending U.S. patent application Ser. No. 09/110,521 entitled Enhanced Performance Connector, the contents of which are incorporated by reference. The other side adapters 200 are connected, via a plugs 100, to cable from a telecommunications closet or adjacent furniture panel.

Figure 28:
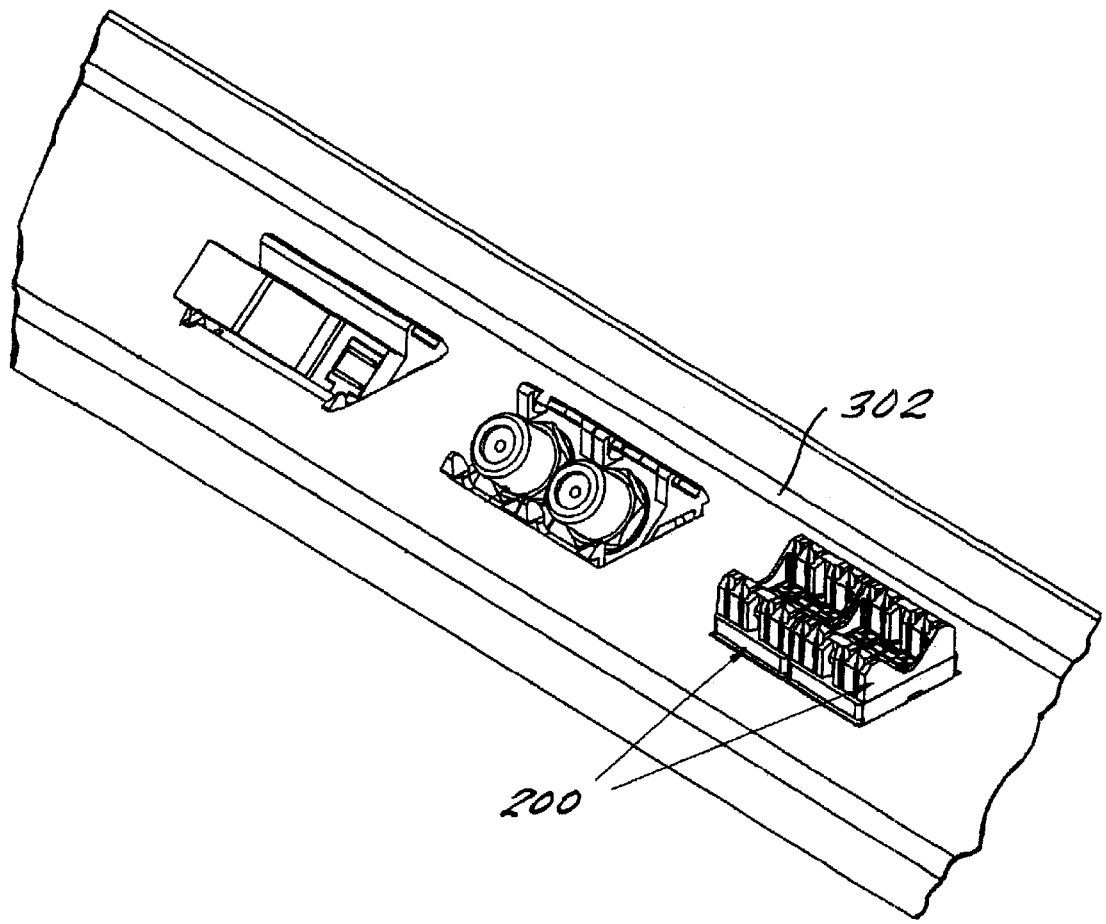
FIG. 28 is an enlarged view of a portion of FIG. 27.

FIG. 28 is a perspective view of two adapters 200 mounted in bracket 302. As shown throughout the drawings, the plugs 100 and 150 and the adapters 200 have planar sidewalls. This allows the plugs 100 or 150 and the adapters 200 to be mounted side-by-side in contact with each other. This preserves space and allows a higher density of adapters/plugs per area.

FIG. 29 is a perspective view of an alternative plug in an exemplary embodiment of the invention. Plug 400 includes a plug cover 402 and a plug base 404. Plug base 404 is made up of a cable termination portion 406 and a mating portion 408. A cable 500 is shown coupled to the plug 400. Plug 400 uses contacts similar to first contact 106 and second contact 106' described above. The mating portion 408 is similar to plug base 104 described above. As described in detail herein, the mating portion 408 receives a contact end 114 of contacts 106 and 106' as described above. The insulation displacement end 112 of contacts 106 and 106' is received in cable termination portion 406 which is similar to connecting block 202 described above and similar reference numbers are used for similar elements. The mating portion 408 mates with adapter 200 shown in FIG. 25 or an outlet including a connecting block similar to connecting block 202. Cable termination portion 406 and mating portion 408 are joined back-to-back to contain contacts 106 and 106' in plug base 404.

The plug cover 402 includes a side wall 410, front wall 412, rear wall 414 and top 416. A hinged side wall 418 allows the cable 500 to be terminated to termination portion 406 prior to installing plug cover 402. Front wall 412 includes a recess 426 for receiving an identification icon 428. The plug cover 402 engages cable termination portion 406 such that front wall 412 and rear wall 414 are positioned outside the cable termination portion 406. In other words, the cable termination portion 406 is straddled between the front wall 412 and rear wall 414. The side wall 410 and hinged side wall 418 have an arcuate bottom edge that corresponds to an arcuate surface on the top edge of cable termination portion 406. Front wall 412 and rear wall 414 include a plurality of notches 420 formed in the bottom edge thereof. The notches 420 are aligned with contact slots 220 in cable termination portion 406. Notches 420 receive a distal end of wires which extend out of contact slots 220 after termination.

Figure 31:
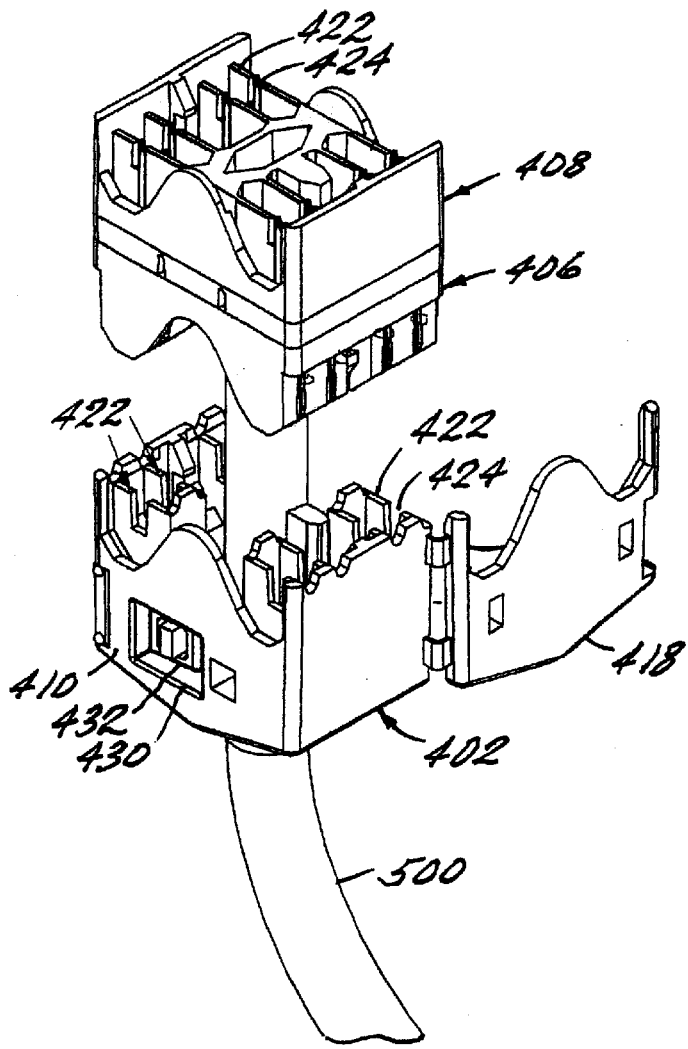
FIG. 31 is a perspective view of the second alternative plug.

The plug cover 402 provides two forms of strain relief, namely cable strain relief and individual wire strain relief. Referring to FIGS. 29–31, individual wire strain relief is achieved using ribs 422 provided on the inside of plug cover 402. Each of the ribs 422 is aligned with and received in a contact slot 220 in cable termination portion 406. Each of the ribs 422 includes a notch 424 that receives the insulation displacement end 112 of contacts 106 and 106'. The distal or bottom edge of rib 422 contacts the wire at two locations to press the wire against the bottom of contact slot 220 and provide strain relief. FIG. 29A depicts the rib 422 straddling an insulation displacement end 112 of contact 106 and contacting wire 600 to provide strain relief for individual wires.

Figure 31A:
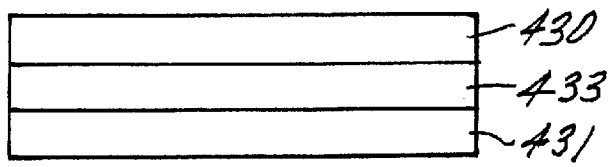
FIG. 31A is a top view of a recess for receiving a cable tie head.

Strain relief for the cable 500 is provided through the use of a cable tie which secures the cable 500 to the plug cover 402. Side wall 410 includes a recess 430 for receiving a head 432 of a cable tie 434. FIG. 31A depicts recess 430 without a cable tie installed. Recess 430 includes bottom wall 433 having an opening 431 formed therein for allowing the cable tie 434 to encircled to cable 500 and return to head 432 for securing the cable tie 434 to cable 500. This secures the cable 500 to plug cover 402 to provide strain relief for the cable 500. The opening 431, shown as a slot in an exemplary embodiment, in the bottom wall 433 of recess 430 is smaller than the cable tie head 432. The recess 430 contains the cable tie head 432 which prevents the cable tie head 432 from extending beyond side wall 410. This allows plugs 400 to be side stackable. FIGS. 29, 30 and 31 depict the plug cover 402 distanced from the cable termination portion 406 with the cable tie 434 installed for ease of illustration. It is understood that plug cover 402 is mated with cable termination portion 406 prior to securing the cable tie 434 to cable 500.

Hinged side wall 418 is secured to rear wall 414 at hinges 436 which may, for example, be a living hinge co-molded with rear wall 414 and hinged door 418. The inside surface of hinged door 418 includes an arcuate surface 438 which is semi-cylindrical in an exemplary embodiment. The arcuate surface 438 is shaped so as to correspond to the outside surface of cable 500. The arcuate surface 438 includes a groove 440 for receiving cable tie 434. The groove 440 is aligned with the opening 431 in the bottom wall 433 of recess 430. This ensures that the cable tie 434 is aligned with groove 440 so that hinged side wall 418 can close. A front edge 442 of hinged side wall 418 includes a notch 444 for accommodating an edge of identification icon 428. A pair of latches 446 on hinged side wall 418 engage recesses 448 formed in the interior of plug cover 402 to retain hinged side wall 418 in a closed position.

Mating portion 408 mates with connecting block 202 either as part of an adapter 200 as shown in FIG. 25 or as part of a connector (e.g., an outlet) including a connecting block 202. Accordingly, mating portion 408 is similar to plug base 104 described above. In addition, the mating portion 408 also includes structure for providing strain relief to individual wires in connecting block 202. As shown in FIG. 31, mating portion 408 includes ribs 422 having notches 424 therein for providing strain relief to individual wires as described above with reference to plug cover 402.

Figure 32:
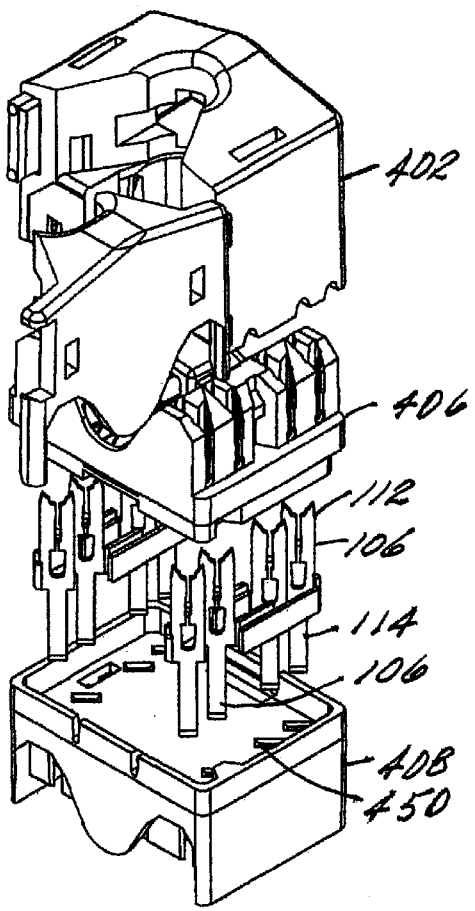
FIG. 32 is an exploded, perspective view of the second alternative plug.
Figure 33:
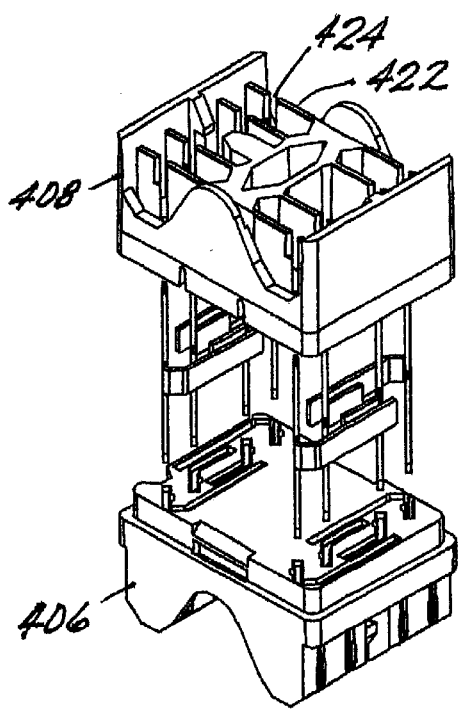
FIG. 33 is an exploded, perspective view of the second alternative plug.

FIGS. 32 and 33 are exploded perspective views depicting the position of the contacts 106 and 106' in the cable termination portion 406 and the mating portion 408. As described above the contacts 106 and 106' include a contact end 114 and an insulation displacement end 112. The contact end 114 passes through openings 450 in the base of mating portion 408. The contact ends 114 will engage contacts in an adapter 200 or a connector fitted with a connecting block 202. The insulation displacement ends 112 are received in the contact slots 220 in the cable termination portion 406. Contacts 106 and 106' include plates 116 for crosstalk compensation as described above. The mating portion 408 and the cable termination portion 406 snap fit together to form a plug base 404.

Figure 34:
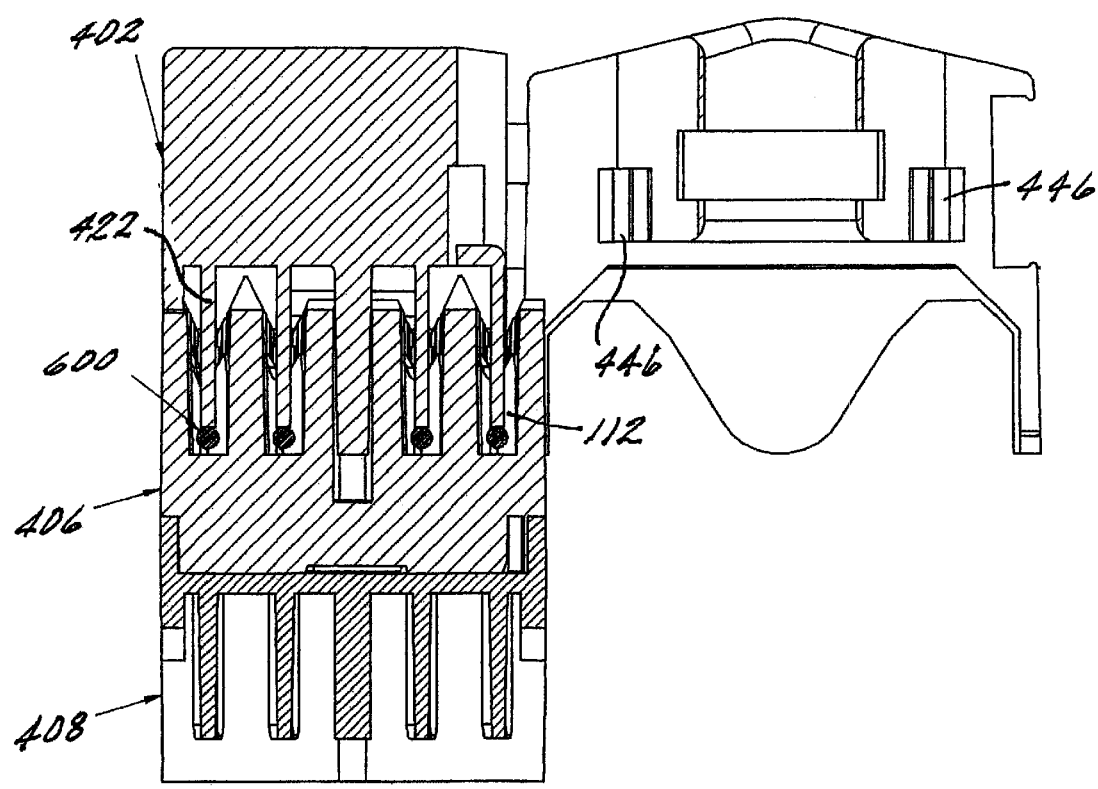
FIG. 34 is a cross sectional view of the second alternative plug.
Figure 35:
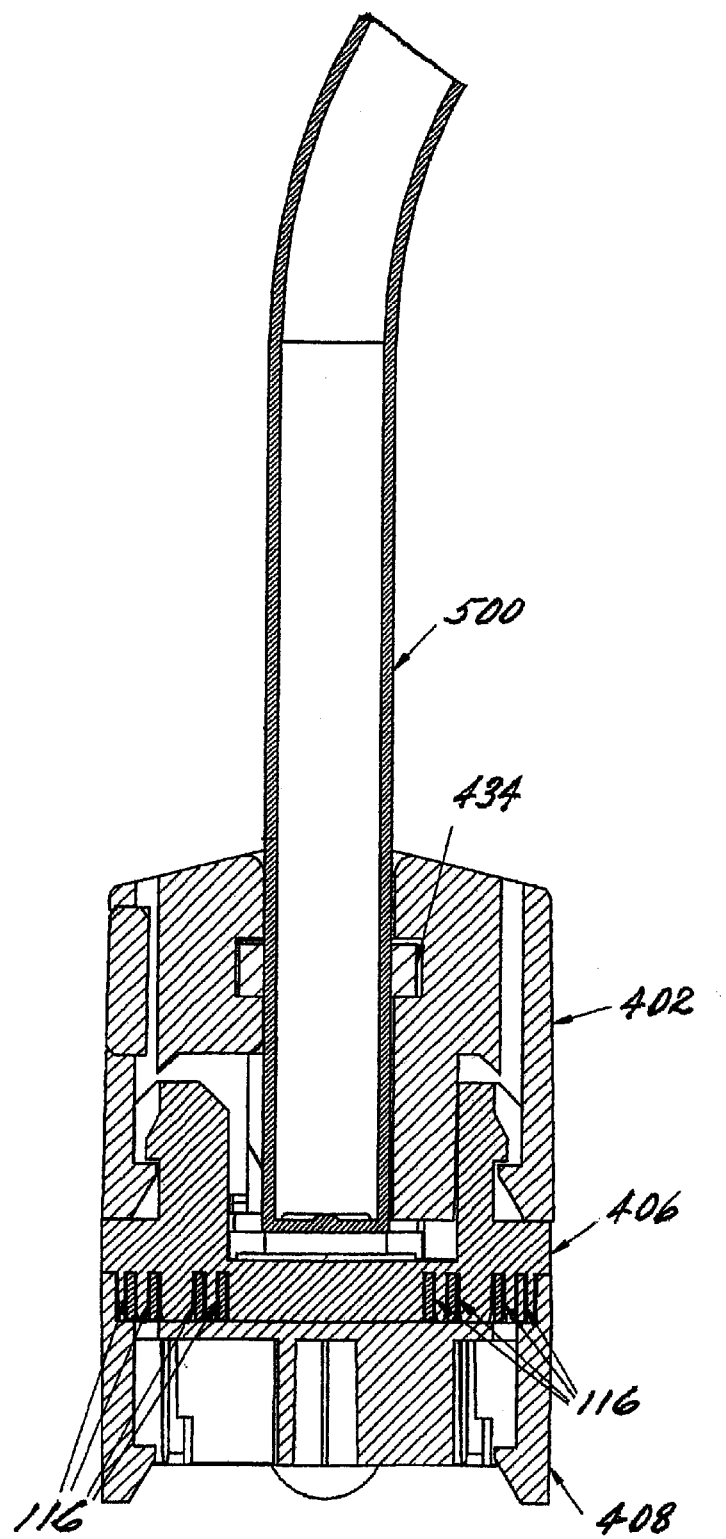
FIG. 35 is a cross sectional view of the second alternative plug.

FIG. 34 is a cross sectional view of plug 400 depicting the individual wire strain relief. As shown in FIG. 34, individual wires 600 are contacted by ribs 422 to apply slight pressure on each wire 600 and provide individual strain relief for each wire 600. FIG. 35 is a cross sectional view of plug 400 depicting the plates 116 on contacts 106 and 106'. As described above, the proximity of plates 116 provides for cancellation of crosstalk.

Installation of cable 500 into plug 400 will now be described. Initially, cable 500 is terminated on cable termination portion 406 as is known in the art. Individual wires in cable 500 are aligned with cable slots 220 and a punch down tool is used to terminate the wire on the insulation displacement end 112 and to trim the wire at the same time. The distal end of each wire will extend beyond the cable slot 220 in cable termination portion 406. As described above, the distal ends of the wires are received in notches 420 in front wall 412 and rear wall 414.

Once the cable 500 has been terminated in cable termination portion 406, the plug cover 402 is secured to cable termination portion 406. With the hinged side wall 418 open, the plug cover 402 can be slipped over cable 500 and the plug cover 402 slid along the cable 500. Plug cover 402 is snap fit to cable termination portion 406. Cable tie 434 is then routed through opening 431 in the bottom of recess 430, around cable 500 and back though the opening to cable head 432 to secure the cable 500 to the plug cover 402. The hinged side wall 418 is then closed to complete installation.

The adapter and plug described herein can reduce the number of interconnections that exist between the work area outlet and the telecommunications closet. In conventional furniture cabling systems, cabling is performed solely in a panel-to-panel manner. This means that between adjacent panels, there is a telecommunications interconnection point. Channel transmission performance is degraded as more interconnections are added to the channel. The present invention provides an adapter in each panel which can be wired directly to a consolidation point (CP) or telecommunications closet as shown in FIG. 27. A patch cord fitted with plugs in accordance with the present invention is used to connect the adapter to the work are outlet. This reduces the number of interconnections to the work area outlet and preserves channel performance.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A telecommunications plug for use with a cable including a plurality of wires, comprising:
   a plug base having a termination portion, said termination portion including a plurality contact slots, each contact slot receiving one of the wires,
   a plurality contacts each having an insulation displacement end positioned in a respective contact slot for establishing electrical connection with one of the wires; and a plug cover having a plurality of ribs aligned with said contact slots, said ribs contacting said wires to provide strain relief to said wires wherein:
   each of said ribs includes a notch for receiving the insulation displacement end of said contacts, each of said ribs contacting one of the wires on a side of said insulation displacement end of said contact to provide strain relief.

2. The telecommunications plug of claim 1 further comprising:
   an opening in said plug cover;
   a cable tie passing through said opening for engaging the cable and securing the cable to said plug cover.

3. The telecommunications plug of claim 2 wherein:
   said cable tie includes a cable tie head;
   said plug cover includes a side wall, a front wall and a rear wall, said side wall including a recess for receiving said cable head; and
   said opening is formed in said recess.

4. The telecommunications plug of claim 1 wherein:
   said plug cover includes a side wall, front wall, rear wall and a hinged side wall, said hinged side wall being movable between an open position and closed position to selectively provide access to an interior of said plug cover.

5. The telecommunications plug of claim 4 wherein:
   said hinged side wall is hingedly secured to said rear wall.

6. The telecommunications plug of claim 4 wherein:
   said hinged side wall includes an arcuate inside surface corresponding to an outside surface of the cable.

7. The telecommunications plug of claim 6 wherein:
   said arcuate inside surface is semi-cylindrical.

8. The telecommunications plug of claim 4 wherein:
   said side wall and said hinged side wall are planar to allow for side by side mounting of a plurality of said telecommunications plugs.

9. The telecommunications plug of claim 1 wherein:
   said plug cover includes a front wall and a rear wall, each of said front wall and said rear wall including notches formed in an edge thereof, said notches being aligned with said contact slots for receiving distal ends of the wires.

10. The telecommunications plug of claim 1 wherein:
    said plurality contacts each include a contact end opposite said insulation displacement end;
    said plug base including a mating portion coupled to said cable termination portion, said mating portion receiving said contact end of said plurality of contacts;
    said mating portion including a plurality of further ribs, each further rib being positioned adjacent to said contact end of one of said plurality of contacts.

11. The telecommunications plug of claim 10 wherein:
    each of said further ribs includes a further notch, said further notch receiving said contact end of each of said plurality of contacts.

12. The telecommunications plug of claim 1 wherein:
    said contacts are arranged in pairs of contacts, said contacts including plates for reactively coupling a contact from a first pair with a contact from a second pair to reduce crosstalk between said first pair and said second pair.

13. The telecommunications plug of claim 12 wherein:
    said plates capacitively couple said contact from said first pair with said contact from said second pair to reduce crosstalk between said first pair and said second pair.

14. The telecommunications plug of claim 1 wherein said each of said ribs contacts one of the wires on each side of said insulation displacement end of said contact to provide strain relief.

15. The telecommunications plug of claim 1 wherein a distal end of each of said ribs contacts one of the wires on the side of said insulation displacement end of said contact to provide strain relief.

16. A telecommunications plug for use with a cable including a plurality of wires, comprising:

a plug base having a termination portion, said termination portion including a plurality contact slots, each contact slot receiving one of the wires, a plurality contacts each having an insulation displacement end positioned in a respective contact slot for establishing electrical connection with one of the wires;

a plug cover having a plurality of ribs aligned with said contact slots, said ribs contacting said wires to provide strain relief to said wires;

said plug cover includes a side wall, front wall, rear wall and a hinged side wall, said hinged side wall being movable between an open position and closed position to selectively provide access to an interior of said plug cover, said hinged side wall includes an arcuate inside surface corresponding to an outside surface of the cable;

an opening in said plug cover;

a cable tie passing through said opening for engaging the cable and securing the cable to said plug cover;

wherein said arcuate inside surface of said hinged side wall includes a groove for receiving said cable tie.

17. The telecommunications plug of claim 16 wherein:

said opening is aligned with said groove to align said cable tie with said groove.

* * * * *